(12) United States Patent
van der Wal et al.

(10) Patent No.: US 7,672,266 B2
(45) Date of Patent: Mar. 2, 2010

(54) RECEIVER WITH ADAPTIVE DETECTION THRESHOLD FOR TDMA COMMUNICATIONS

(75) Inventors: Arnoud van der Wal, Napier (NZ); Hans van Nigtevecht, Enschede (NL)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1527 days.

(21) Appl. No.: 10/491,867

(22) PCT Filed: Oct. 10, 2001

(86) PCT No.: PCT/EP01/11729

§ 371 (c)(1), (2), (4) Date: Sep. 17, 2004

(87) PCT Pub. No.: WO03/034674

PCT Pub. Date: Apr. 24, 2003

(65) Prior Publication Data

US 2005/0220066 A1 Oct. 6, 2005

(51) Int. Cl.
*H04B 7/212* (2006.01)
(52) U.S. Cl. .................. 370/321; 370/343; 370/347
(58) Field of Classification Search .......... 370/347, 370/334, 252; 455/277.2, 273
See application file for complete search history.

(56) References Cited

U.S. PATENT DOCUMENTS

| | | | |
|---|---|---|---|
| 4,821,292 A | | 4/1989 | Childress |
| 5,757,859 A | * | 5/1998 | Retzer et al. ............... 375/346 |
| 5,933,455 A | * | 8/1999 | Hendrickson et al. ....... 375/261 |
| 6,032,033 A | * | 2/2000 | Morris et al. ............ 455/277.2 |
| 6,073,009 A | * | 6/2000 | van der Tuijn et al. ... 455/422.1 |
| 6,631,103 B1 | * | 10/2003 | Yamanoi et al. ......... 369/47.17 |
| 2005/0220066 A1 | * | 10/2005 | Wal et al. .................... 370/343 |

* cited by examiner

*Primary Examiner*—Charles N Appiah
*Assistant Examiner*—Joy K Contee

(57) ABSTRACT

A method of and a digital data recovery circuit (1) for extracting digital data from an analog data signal in a Time Division Multiple Access (TDMA) communications system, wherein the analog data signal of a communications link is exchanged in bursts or time slots. The circuit (1) comprises analog-to-digital (ADC) converter means (4), digital filter means (6) for providing a threshold or slice level, and digital comparator means (5) for comparing the digital data signal and the slice level for providing the recovered digital data. The digital filter means (6) comprise storage means (15) for digitally adjusting the filter time constants and slice level for each burst or time slot independently in accordance with specific settings applicable to a communications link associated with a burst or time slot.

15 Claims, 3 Drawing Sheets

RECEIVER WITH ADAPTIVE DETECTION THRESHOLD FOR TDMA COMMUNICATIONS

FIELD OF THE INVENTION

The present invention relates generally to telecommunications systems and, more specifically, to a method and equipment for extracting digital data from an analog data signal in a Time Division Multiple Access (TDMA) communications system, wherein said analog data signal of a communications link is exchanged in bursts or time slots, said digital data being recovered by comparing whether said analog data signal is above or below an adaptable threshold or slice level, using a data recovery circuit, wherein said slice level is set for each burst or time slot.

BACKGROUND OF THE INVENTION

A method and equipment of this kind are for instance described in U.S. Pat. No. 4,821,292, disclosing a receiver unit comprising a data recovery circuit comprised of a comparator, an RC network, a modem/dotting pattern detector and a microprocessor. The comparator circuit compares the voltage level of an input signal with a threshold DC reference voltage or slice level, and determines whether a logic "1" or a logic "0" is represented by the analog signal. The resulting bitstream is provided to the modem/dotting pattern detector which converts the serial data signal to a parallel signal. The incoming analog signal which is evaluated by the comparator, represents a data message comprised of a preamble or dotting pattern and a message part. During transmission of the dotting pattern, the time constant of the RC network is decreased in order to be able to adapt the DC voltage or slice level quickly during the preamble part of the data signal.

In present wireless telecommunications systems, such as the well-known mobile GSM (Global System for Mobile communication) and cordless DECT (Digital Enhanced Cordless Telecommunication) radio communications systems, information to be exchanged is digitally processed. For transmission purposes, the digital data are suitably modulated on an RF carrier and transmitted as an analog data signal.

In the radio receiver part of radio equipment of such radio communications systems, after demodulation, for processing purposes, the received analog data signal is converted into a digital data signal again by means of a data recovery circuit, also called a data slicer.

International patent application WO 93/26110 discloses a data recovery circuit wherein the decision as to whether the currents value of the analog data input signal represents a binary null or a binary one is performed by comparing whether the analog data input signal is above or below a predetermined threshold or slice level. The slice level is derived from the analog data input signal by means of an integrator circuit comprising a resistor and capacitor connected as a Low Pass (LP) filter.

The slice level must be able to vary in order to adjust to a particular received data input signal. To this end, by means of switches, resistors of different values can be selected for increasing or decreasing the integration time constant of the integrator circuit.

Savings in the number of components, the space which components take on a Printed Circuit Board (PCB), and manufacturing costs are important design criteria in modern wireless telecommunications transceiver equipment.

Analog data slicers of the type disclosed above require a lot of discrete electronic components. Further, for changing the integration time constant, hardware has to be changed, i.e. resistors and/or capacitors.

It has been observed that in communications systems operating in accordance with a Time Division Multiple Access (TDMA) transmission scheme, wherein data are exchanged in frames and each frame comprises a number of bursts or time slots, after the detection of the so-called synchronization or sync word, a DC offset occurs in the threshold or slice level. The sync word is a particular string of bit values (ones and zeroes) which have to be identified by the receiver equipment in order to process the received data correctly.

The offset in the slice level is caused by the specific bit pattern of the sync word, i.e. an unequal number of ones and zeroes, which cannot be compensated for by the analog data slicer, and which degrades the receiver sensitivity and performance.

Other sources of DC offset in a receiver are, among others, frequency deviations in reference oscillators, transmitter frequency differences, demodulator offset, and interferer signals received by the receiver.

In cellular GSM or DECT radio communications systems, for example, radio base stations or radio access units provide service to a plurality of remote radio communication units in a particular geographical area, also called a cell. At a particular radio base station or radio access unit, for each communications link, that is an RF carrier/time slot combination, the DC slice level offset may vary, among others, dependent on the distance between the radio base station and a radio communication unit, the transmission power of the radio communication unit, whether or not the radio communication unit operates in or outside a building, etcetera.

In order to adapt the data slicer to a particular DC offset during reception, the above disclosed known analog data slicer circuit provides a hold modus for holding the slice level from the previously received time slot for use with the next time slot.

However, in a GSM or DECT radio communications system, the previous time slot of a frame generally belongs to a different communications link with different transmission properties. Accordingly, information as to the slice level experienced during a previous time slot will not necessarily be valid for the next time slot.

Receiver performance would be greatly improved if, for each communications link individually, a particular slice level could be set at the start of each time slot.

SUMMARY OF THE INVENTION

It is an object of the present invention to provide a more versatile digital data recovery method, in order to improve receiver sensitivity and receiver performance.

It is a further object of the present invention to provide an improved digital data recovery circuit or data slicer circuit, providing savings in the number of electronic components, component space on a Printed Circuit Board (PCB) and, eventually manufacturing costs.

In a first aspect of the present invention, there is provided a method of extracting digital data from an analog data signal in a Time Division Multiple Access (TDMA) communications system, wherein the analog data signal of a communications link is exchanged in bursts or time slots, the digital data being recovered by comparing whether the analog data signal is above or below an adaptable threshold or slice level, using a digital data recovery circuit, characterized in that the slice level is set for each burst or time slot independently in accordance with specific settings applicable to a communications link associated with a burst or time slot.

With the method according to the invention, because the slice level is set for each link individually, variations in the slice level due to differing radio link conditions can be accurately accounted for such that as much as possible optimum receiver performance for each radio link, i.e. carrier/time slot combination, can be achieved.

In a further embodiment of the method according to the invention, at the end of a particular burst or time slot associated with a particular communications link the current slice level is stored and the slice level is retrieved at the start of a next corresponding burst or time slot associated with the communications link.

That is, for a particular communications link, the slice level at the end of a time slot is stored, which slice level can be regarded as the momentarily best level for recovering the digital data of the respective radio communications link. This slice level is again retrieved and set at the start of the next time slot (in a next frame) associated with the particular radio communications link. Thereby receiver performance is improved already from the start of the receipt of a time slot, because the synchronization word will be recovered with optimum accuracy.

In another embodiment of the invention, at starting a communications link, the slice level is adapted in accordance with a first receive mode, and at continuation of the communications link, while meeting predetermined criteria, the slice level is adapted in accordance with a second receive mode. With this feature, the slice level can be adapted to varying receive conditions both during the start of a link, i.e. using the first receive mode, and while communication is in progress, i.e. using the second receive mode, in an as optimum as possible manner.

In a yet other embodiment of the invention, in order to improve the receiver performance even further, for each receive mode the slice level is adapted in accordance with slice time constants ranging from ultra fast to fast and eventually to slow or put on hold.

The ultra fast slice time constants of the first receive mode are used during the very beginning of the receipt, i.e. during the receipt of a preamble, for example, while no slice level is available or just a default slice level. Once a slice level is built up and the synchronization word will be received, the fast slice time constant is selected, such that the slice level can be adapted in a sufficient quick manner for recovering the synchronization word, while providing sufficient hardness to noise and the like. Once the synchronization word has been correctly identified, the slice level is adapted following the slow or even the hold mode.

It is desired that a workable slice level has to be quickly acquired when the analog data input signal first appears. As soon as part of the digital data input signal has been identified, for example a preamble or part of a preamble, the adaptation speed of the slice level can be slowed down. Once the receiver is synchronized with the received analog data input signal, which can be identified by a correct reception of the sync word, the adaptation rate of the slice level may be set to an even slower speed or, if applicable, in a hold modus, to prevent erroneous decisions due to signal fading, signal peaks or other temporarily disturbances in the analog data signal.

Changeover from the first receive mode to the second receive mode is performed, among others, based on radio link reception quality criteria, such as Bit Error Rate (BER), RSSI (Receive Signal Strength Indication) measurements, etcetera.

In a preferred embodiment of the method according to the invention, the slice level is adapted to correct for DC offset experienced by the digital data recovery circuit. In particular, after reception of a sync word, the slice level is corrected for DC offset caused by the sync word. This, again improves the receiver performance.

The invention further provides, in a practical embodiment, digital storage and retrieval of the slice level and slice time constants, wherein the digital data recovery circuit comprises analog-to-digital (ADC) converter means for converting the analog data signal into a digital data signal, digital filter means for filtering the digital data signal, digital storage means and digital comparator means for comparing the digital data signal and the filtered digital data signal for providing the recovered digital data.

In a second aspect of the present invention, there is provided a digital data recovery circuit for extracting digital data from an analog data signal in a Time Division Multiple Access (TDMA) communications system, comprising analog-to-digital (ADC) converter means for converting the analog data signal into a digital data signal, digital filter means for filtering the digital data signal in accordance with set filter time constants, the filter means providing a threshold or slice level, and digital comparator means for comparing the digital data signal and the slice level for providing the recovered digital data, wherein the digital filter means are arranged for digitally adjusting the filter time constants and slice level.

The digital data recovery circuit or digital data slicer according to the invention can be implemented in an integrated semiconductor circuit, either as a separate component or combined with other integrated circuitry used in telecommunication equipment, such as a so-called Burst Mode Controller (BMC) providing control of the bursts or time slots transmitted and received in a TDMA telecommunication system, for example.

By using digital filter means, the filter or integration time constants of the filter means of the digital data recovery circuit can be easily set and optimized or adapted in software without having to change or replace one or more of the hardware components of the data recovery circuit.

Accordingly, receiver performance can be automatically improved by adapting the integration time constant of the digital filter means during a communications link, in order to set the most optimum threshold or slice level, for example based on received signal quality criteria.

In a preferred embodiment of the invention, the digital filter means comprise an LP Infinite Impulse Response (IIR) filter having at least one digitally adjustable filter time constant.

In this embodiment, by a proper setting of the or each filter time constant in software, any change in the slice level, such as an offset after detection of the sync word, can be easily compensated thereby improving receiver sensitivity significantly.

With the digital data recovery circuit according to the invention comprising an IIR digital filter, for example, the or each filter time constant can be set to provide a slow, fast and ultra fast integration time, i.e. a slow, fast or ultra fast adaptation of the slice level, or into a hold mode.

In a yet further embodiment of the digital data recovery circuit according to the invention, the digital filter means have at least two digitally adjustable filter modes, arranged such that for each filter operation mode the filter time constants can be set separately. This, in order to provide a quick and optimum and accurate adaptation of the slice level during both the start and the continuation of a radio communication.

In another embodiment of the digital data recovery circuit according to the invention, storage means are provided for storing the or each slice level and/or filter time constants for a particular communications link.

With this embodiment, for each subsequent burst or time slot of a particular communications link, that is an RF carrier/time slot combination, the slice level of the digital data recovery circuit can be directly set to a particular value, and with an adaptation speed optimized for the respective communications link.

In a preferred embodiment of the invention, the digital data recovery circuit further comprises means for adjusting the slice level taking DC offset levels into account.

Because the digital data recovery circuit according to the invention can be completely realized in integrated semiconductor technology, as a separate circuit component or incorporated in other integrated semiconductor circuits, the digital data recovery circuit according to the invention is less space consuming and cheaper to mount in telecommunications equipment, in particular radio equipment of a radio communications system for wireless telecommunication, comprising transmitter, receiver and control means, arranged for providing radio communication in accordance with a wireless communications standard.

In a third aspect the invention relates to radio equipment of a radio communications systems for wireless telecommunication, comprising transmitter, receiver and control means, arranged for providing radio communications in accordance with a Time Division Multiple Access (TDMA) radio communications standard, the radio equipment comprising a digital data recovery circuit arranged and operated as disclosed above. In particular radio equipment arranged as a radio access unit or radio base station, and radio equipment arranged as a radio terminal unit, such as radio telephone, for use in a cellular radio communications system.

The above mentioned and other features and advantages of the invention are illustrated in the following description with reference to the enclosed drawings.

DETAILED DESCRIPTION OF A PREFERRED EMBODIMENT

Without the intention of a limitation, the invention will now be explained by its application in a cordless radio telephone system operating in accordance with the Digital Enhanced Cordless Telecommunication (DECT) standard. The invention is also applicable in other cordless radio telephone systems, such as operating in accordance with the Personal Handyphone System (PHS) standard or in a mobile radio communications system, such as operating with the Global System for Mobile communication (GSM) standard or any other mobile communications protocol.

Figure 1:
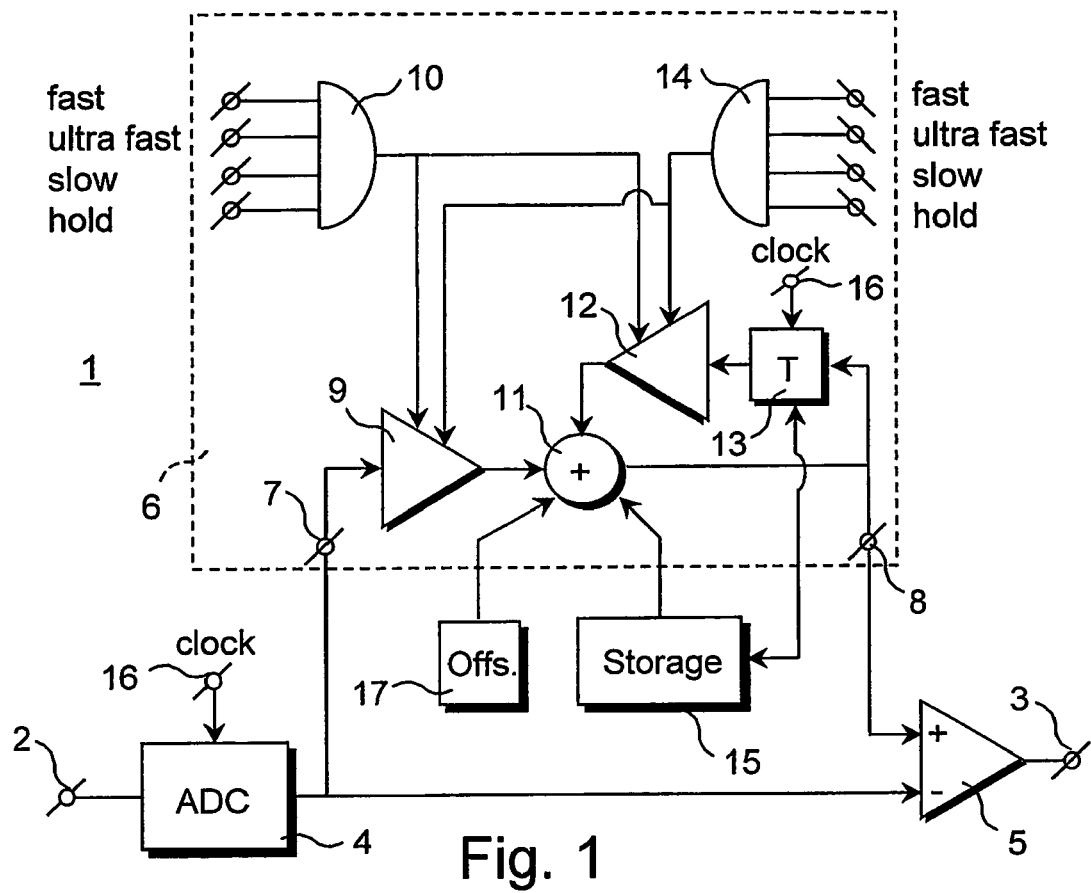
FIG. 1 shows a block diagram of an embodiment of a digital data recovery circuit according to the present invention.

FIG. 1 illustrates a digital data recovery circuit or digital data slicer according to the invention, generally designated by reference numeral 1.

The digital data recovery circuit comprises an input terminal 2 for applying a received analog data signal and an output terminal 3 at which digital data extracted from the analog data signal are provided.

In radio receiver equipment, for example, such as a radio receiver of a radio base station or radio access unit and a radio communication unit, such as a portable radio telephone, of a DECT or GSM system, the input terminal 3 receives an analog data signal from demodulation means (not shown). The demodulated analog data input signal is a mixture of digitized control data, system data and user or information data, consisting of both an AC signal (data) and a DC signal component. The DC signal component has a certain value depending on the frequency of the received signal, the type of demodulator and/or interferences.

By a fast Analog-to-Digital Converter (ADC) 4, the analog data input signal is sampled and digitized, for example into an 8 bit digital representation.

The output of the ADC 4 is connected to a first input of digital comparator means 5 and an input terminal 7 of digital filter means 6, an output terminal 8 of which connects to a second input of the digital comparator means 5.

The digital filter means 6 are of the so-called Infinite Impulse Response (IIR) type comprising first multiplier means 9, a first input of which connects to the input terminal 7 of the digital filter means 6 and a second input of which connects to selection means 10 for selecting filter time constants in a first receive mode.

The first multiplier means 9 connect with an output to a fist input of summation means 11, a second input of which connects to an output of second multiplier means 12. An output of the summation means 11 connects to the output terminal 8 of the digital filter means 6.

A first input of the second multiplier means 12 connects to an output of unit delay (T) means 13 and a second input of the second multiplier means 12 connects to second selection means 14 for setting filter time constants in a second receive mode. The unit delay means 13, for example in the form of a clocked multiple of D-type flip flops, connect with an input thereof to the output terminal 8 of the digital filter means 6.

In a preferred embodiment of the digital data slicer according to the invention, storage means 15 are provided, for storing/retrieving slice levels for a particular communications link, i.e. a carrier/time slot combination. For clarity purposes, the storage means 15 schematically connect to a third input of the summation means 11. The storage means 15 further may comprise a default value for setting a slice level in the event that no slice level particular to a communications link is available.

A fourth input of the summation means 11 connects to a source 17 for correcting the slice level for DC offsets, such as, but not limited to, DC offset caused by an unequal number of zeroes and ones in a synchronization word to be received.

In a practical embodiment, if the sampled analog data input signal is provided by the ADC as an 8 bit digital data word, the filter time constants may also be provided in an 8 bit representation, whereas the first and second multiplier means 9, 12, the summation means 11, the unit delay means 13, the storage means 15 and the DC offset source 17 can be arranged for processing data in a 16 bit binary representation, for example.

The digital filter 6 operates as a Low Pass (LP) digital filter or integrator. The unit delay T is equal to 1/sample clock frequency. The theory and operation of digital filters is known to those skilled in the art, such that no further explanation is presented here.

Figure 2:
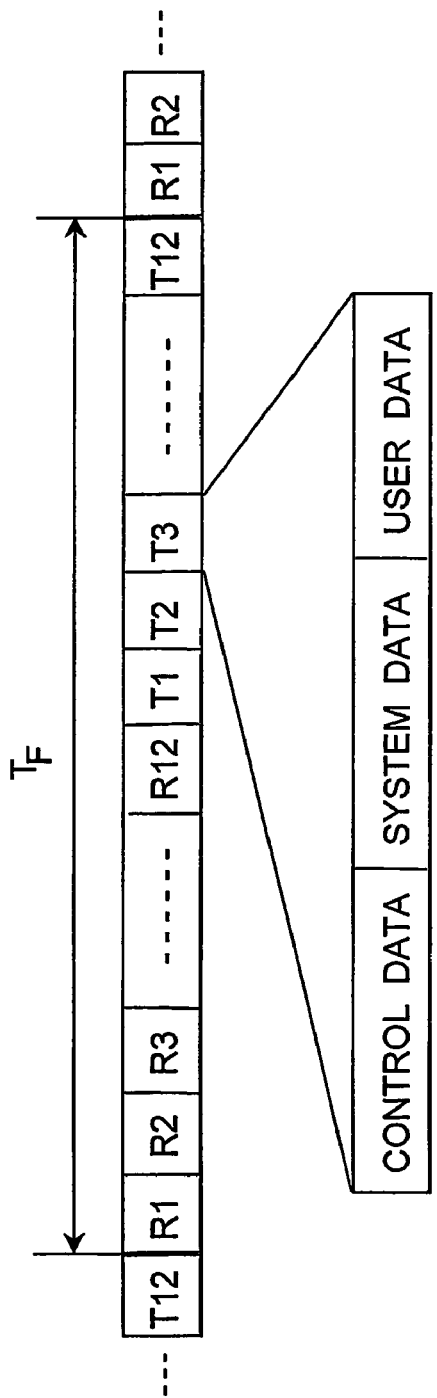
FIG. 2 shows, in a schematic and illustrative manner, a digital data stream in accordance with the Digital Enhanced Cordless Telecommunication (DECT) transmission protocol.

For clarification purposes, FIG. 2 shows a digital data stream in accordance with the Digital Enhanced Cordless Telecommunication (DECT) standard. DECT operates in accordance with a TDMA/TDD (Time Division Multiple Access/Time Division Duplex) protocol, wherein information is transmitted in time slots which are grouped into frames with a frame cycle time $T_F$. The first half of a frame is used for transmission and the other half of the frame is used for reception purposes, or visa versa. A DECT frame comprises 24 bursts or time slots, as shown in FIG. 2. During the first half of the frame, i.e. the first 12 time slots designated R1, R2, . . . , R12, data transmitted from a radio base station or radio access unit are received by a remote radio communication unit, such as a portable telephone. In the second half of each frame, i.e. the second 12 time slots designated T1, T2, . . . , T12, a remote communication unit transmits data to the radio access unit.

In general, a radio communications link between a radio access unit and a remote radio communication unit is assigned a slot in the first half of the frame and a slot bearing the same number in the second half of the frame. Each time-slot typically contains control data, system data and information or user data. In DECT multiple time-slots may be assigned to a particular radio communications link.

Figure 3:
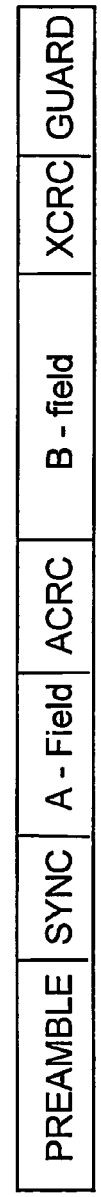
FIG. 3 shows, in detail, the structure of a time slot of the data stream of FIG. 2.

A more detailed time-slot structure is shown in FIG. 3. The control data field contains a so-called synchronization (SYNC) word, which has to be correctly identified at a radio access unit or a remote communication unit in order to process the received data correctly. The sync word will typically need 16 bits, proceeded by a PREAMBLE of 16 bits.

The system data field contains system information on identity and access rights, availability of services and, if required, information for hand over to an other communication channel in case of disturbances or transfer of a call to an other radio access unit, for example. Also paging an call setup procedures are carried over the system data field, which is also called A-field. System data will typically need 64 bits with a 16 bit Cyclic Redundancy Check worth (ACRC).

The information or user data, also called B-field, comprise in the case of a telephone call digitized speech samples obtained during the frame cycle time $T_F$ Of 10 ms. The speech samples are coded having a typical bit rate of 32 kb/s. This means that for each speech call 320 bits have to be transmitted and received during each frame.

The B-field data is scrambled and a 4 bit Cyclic Redundancy Check worth (XCRC) is formed from the information data. Including guard space, the total number of bits per time slot according to the DECT standard amounts to 480. These bits are transmitted at the system clock frequency or system bit rate of 1152 kb/s.

In DECT, ten RF carriers are available for the transmission of information, resulting in a total of 120 duplex radio communications links. In the context of the present invention, a radio communications link is to be understood as an RF carrier/time slot allocation.

Figure 4:
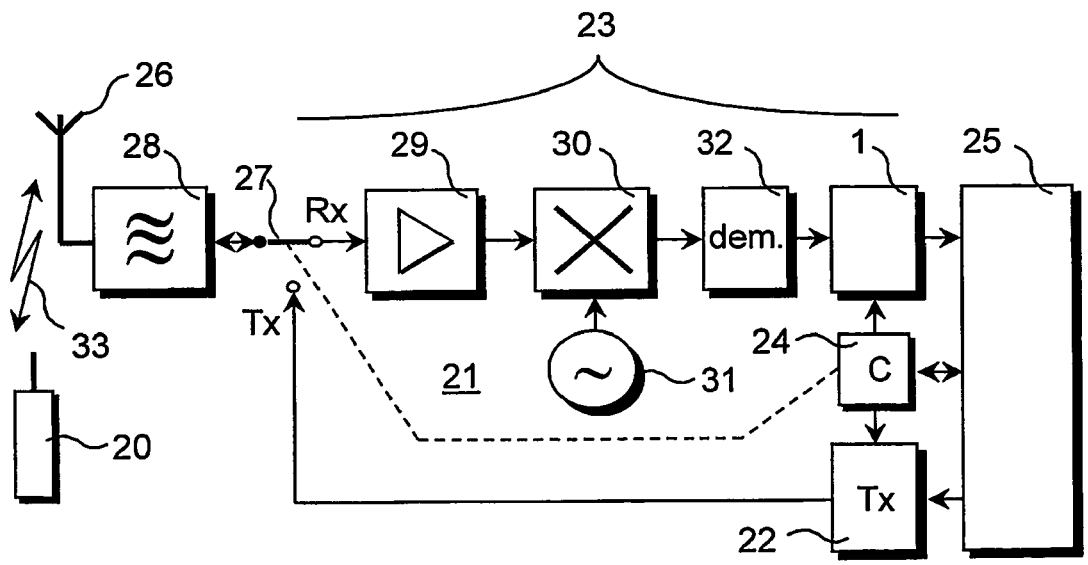
FIG. 4 shows a simplified block diagram of radio equipment provided with a digital data recovery circuit according to the present invention, for use in a radio communications system for wireless telecommunication.

FIG. 4 shows a simplified block diagram of typical DECT radio communication equipment, comprising a remote communication unit 20 and a radio base station or radio access unit 21. The radio access unit 21 may also be designed as a radio relay unit for relaying radio communications between a remote radio communication unit and a radio access unit for example.

The radio access unit 21 comprises transmitter means (TX) 22, receiver means (RX) 23, control means (C) 24 and further processing and input/output means 25, arranged for further processing of speech and data signals received from the receiver means 23 or to be transmitted by the transmitter means 22. The means 25 may comprise processor means for processing the relevant speech and data signals for communication purposes.

The control means 24 are arranged to connect antenna means 26 to either the transmitter means 22 or the receiver means 23 by operating switching means 27.

For the purpose of the present invention, the receiver means 23 are shown in more detail, comprising a cascaded connection of band pass filter means 28, having a center frequency of 1890 MHz for receiving signals within the DECT frequency band of 1880-1900 MHz, for example.

The signals received over a radio communications link 33 between the remote communication unit 20 and the radio access unit 21 are amplified by RF amplifier means 29 and down converted to an Intermediate Frequency (IF) by mixer means 30 and local oscillator means 31. The down converted signal is fed to demodulator means 32, providing an analog data input signal which is fed to a data recovery circuit or data slicer circuit 1 according to the present invention, for extracting digital data from the analog data input signal. The digital data extracted by the digital data recovery circuit 1 are fed to the means 25 for further processing thereof.

Those skilled in the art will appreciate that the remote radio communication unit 20 may comprise transceiver means having the same structure as disclosed for the radio access unit 21. In the case of a radio communication unit 20 designed as a portable radio telephone, for example, the means 25 comprise audio amplifier, microphone and loudspeaker means (not shown).

In a DECT communications system, several remote radio communication units 20 exchange information with a radio access unit 21, each having an individual radio communications link 33 comprising an RF carrier/time slot combination. Assume, for example, three radio communication units 20 each exchanging information with the radio access unit 21 via respective time slots R1/T1; R3/T3 and R12/T12. For each of the communication links, different slice levels may be required, for example dependent on the distance between a remote radio communication unit and the radio access unit, the transmission power of a remote radio communication unit, whether the remote communication unit operates inside or outside a building, fading in the transmission path, etcetera. This, because the setting of the optimum slice level depends on the received signal strength.

Figure 5:
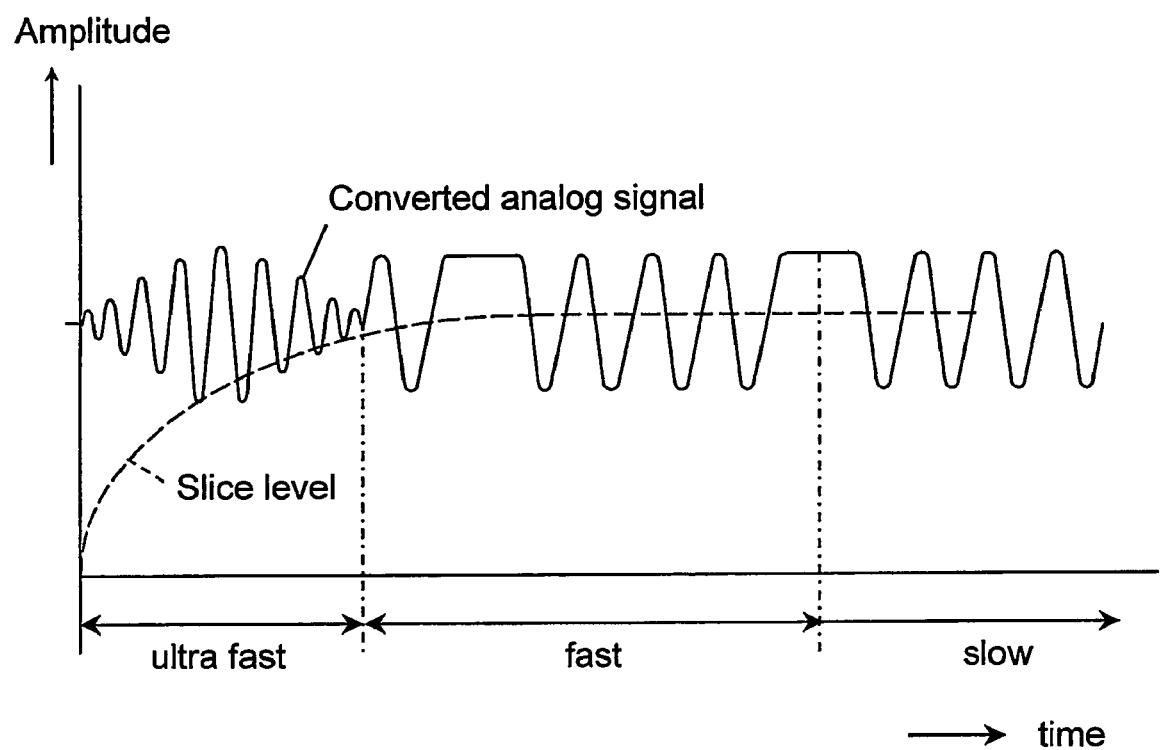
FIG. 5 shows graphically, in a schematic and illustrative manner, adaptation of the slice level during a time slot.

With reference to the graphical representation shown in FIG. 5, not to scale, in a preferred embodiment of the invention, the digital data recovery circuit 1 is operated as follows to set the optimum slice level for extracting the digital data. It is assumed that no slice level has been set, i.e. a zero slice level default value.

At the first reception of a time slot or burst of a radio communications link, the filter 6 is operated in its first receive mode 10. The filter time constants of the digital filter means 6 are selected to provide an ultra fast slice adaptation mode, having a typical integration time constant of 3 μs for a DECT time slot. Very rapid tracking of the slice level is provided, in order to extract the digital data from the data input signal by the comparator means 5. In FIG. 5 this is indicated by the double arrow marked ultra fast.

During the start of the reception, the preamble (FIG. 3) and noise, such as caused by interferers, are received. At the output terminal 8 of the filter 6 a slice level is built up, shown by a dashed line in FIG. 5.

The comparator means 5 compare the converted analog input signal at the output of the ADC 4 with the slice level provided at the output terminal 8 of the digital filter 6. If the converted analog signal is above the slice level, this will be interpreted as a first logic level, e.g. a digital one bit. If the converted analog signal is below the slice level, this will be interpreted as a second logic level, e.g. a digital zero bit.

After having extracted a few bits of the preamble and the sync word, for example 4 bits, the filter time constants are selected to provide a fast slice mode, having a typical integration time constant of 10 μs. This, in order to prevent a too rapid tracking of the slice level due to fading or signal peaks, etcetera. In FIG. 5 this is indicated by the double arrow marked fast.

Once the sync word has been correctly detected, for example, the filter time constants are selected to provide a slow slice mode, having a typical integration time constant of 1 ms. In FIG. 5 indicated by the single arrow slow.

Once synchronization has been achieved, there is no need for rapid tracking of the slice level as the data will be correctly extracted and further refinement of the optimum slice level can be allowed relatively slowly or even not adapted at all, i.e. by putting the filter on hold.

The exact settings of the filter time constants can be easily provided and modified in software, for example under control of the control means 24 of communication equipment provided with the digital data recovery circuit 1 according to the invention (see FIG. 4).

Those skilled in the art will appreciate that the switching over from one time constant to the other not only has to be based on the receipt of part of the digital data, such as the sync word, but can be dependent on other parameters and algorithms.

In DECT, it has been observed that after the detection of the sync word, an offset occurs in the slice level. This offset, which degrades the receiver sensitivity, can be easily compensated by the digital data recovery circuit according to the invention, by correcting the slice level by a slice level DC offset value provided by the source 17. This type of a correction is preferably provided once the filter is switched in its slow response state. Typically the DC offset provided by the sync word will reach a more or less constant value at the end of a time slot, and can be the same for all radio communication links of a particular radio communication system.

In the case of a steady operation, the digital data recovery circuit of the invention can be set into a hold mode, for example. The hold mode is typically selected if the digital data are received correctly during a period of time for a communications link in progress.

In the case of an ongoing radio communications link, an even greater performance improvement can be reached by switching the circuit into a second receive mode 14, having adapted filter time constants. These filter time constants still may comprise ultra fast, fast, slow and a hold mode time constants, however having different (slower) values compared to the first receive mode 10, because the data recovery circuit is almost on target.

At the end of a time slot associated to a particular radio communications link, the delay means 13 comprise the slice level, which is stored in the storage means 15.

At the start of a next time slot associated with the same radio communications link, the delay means 13 are loaded with the stored slice level, to which end an output of the storage means 15 connects to an input of the time delay means 13.

With the data recovery circuit according to the invention, for a communications link in progress, the optimum slice level can be set directly at the start of each new time slot of each next frame associated with a particular communications link, by storing and retrieving the slice level from the storage means 15. Reference is made to FIG. 2.

It is noted that the several filter time constants may be stored too and retrieved from the storage means 15.

With the digital data recovery circuit and method according to the invention, for each radio communications link, i.e. time slot, individually optimum slice levels can be set, once the optimum slice level for a communication in progress has been established by storing and retrieving the respective slice level. This improves the receiver performance significantly and, accordingly, customer satisfaction.

The digital data recovery circuit 1 according to the invention can be implemented in a single semiconductor circuit or as part of other circuitry used in radio communication equipment, such as the control means 24 of receiver equipment, see FIG. 4. Compared to the known analog data recovery circuits, the digital data recovery circuit according to the invention is cheaper to mount on a Printed Circuit Board (PCB) and takes less space, which are important design criteria in view of the reduction of manufacturing costs and in view of the trend towards miniaturizing of telecommunication equipment, such as portable radio telephone equipment.

Although the invention has been disclosed with reference to IIR digital filter means having first and second filter coefficients, those skilled in the art will appreciate that the filter means may also be realized by other types of digital filter means, such as the well known Finite Impulse Response (FIR) digital filter means. Further, different designs of digital filter means can be applied, such as a cascade realization or a parallel realization of an IIR filter.

The invention is further not limited to its application in DECT, but may also be applied with the same advantages in a GSM (Global System for Mobile communication) and any other telecommunications system wherein digital data has to be extracted from an analog data input signal.

The invention claimed is:

1. A method of extracting digital data from an analog data signal in a Time Division Multiple Access (TDMA) communications system, the method comprising:
   exchanging the analog data signal of a communications link in bursts or time slots, wherein the analog data signal is converted to a digital data signal;
   recovering said digital data by comparing whether said analog data signal is above or below an adaptable threshold or slice level;
   using a data recovery circuit, wherein said slice level is set for each burst or time slot independently in accordance with specific settings applicable to a communications link associated with a burst or time slot, wherein said data recovery circuit is a digital circuit, and said set slice level is stored for each burst or time slot, adapting said slice level to correct for DC offset experienced by said digital data recovery circuit after receiving a sync word; and
   comparing said digital data signal and said slice level for providing said recovered digital data, digital filter means being arranged for digitally adjusting filter time constants and said slice level.

2. The method according to claim 1, wherein said slice level is stored at a particular burst or time slot ending associated with a particular communications link and said slice level is retrieved at starting a next corresponding burst or time slot associated with said communications link.

3. The method according to claim 2, wherein at starting a communications link said slice level is adapted in accordance with a first receive mode, and wherein at continuation of said communications link, while meeting predetermined criteria, said slice level is adapted in accordance with a second receive mode.

4. The method according to claim 3, wherein for each receive mode said slice level is adapted in accordance with slice time constants ranging from ultra fast to fast and to slow or put on hold.

5. The method according to claim 4, wherein said predetermined criteria include radio communications link reception quality criteria.

6. The method according to claim 5, wherein at starting a communications link said slice level is set to a default value.

7. A method of extracting digital data from an analog data signal in a Time Division Multiple Access (TDMA) communications system, the method comprising:
exchanging said analog data signal of a communications link in bursts or time slots;
recovering said digital data, using a data recovery circuit, by comparing whether said analog data signal is above or below an adaptable threshold or slice level, said slice level being adapted to correct for DC offset experienced by said data recovery circuit after receiving a sync word;
setting said slice level for each burst or time slot independently in accordance with specific settings applicable to a communications link associated with a burst or time slot, wherein said data recovery circuit is a digital circuit and said set slice level is stored for each burst or time slot; wherein said digital data recovery circuit comprises:
analog-to-digital (ADC) converter means for converting said analog data signal into a digital data signal,
digital filter means for filtering said digital data signal,
digital storage means for storing said slice level and slice time constant; and
digital comparator means for comparing said digital data signal and said filtered digital data signal for providing said recovered digital data, wherein said slice level and slice time constants are digitally stored and retrieved from said storage means.

8. A digital data recovery circuit for extracting digital data from an analog data signal in a Time Division Multiple Access (TDMA) communications system, the recovery circuit comprising:
analog-to-digital (ADC) converter means for converting said analog data signal into a digital data signal,
digital filter means for filtering said digital data signal in accordance with set filter time constants, said filter means providing a threshold or slice level, wherein said slice level is set for each burst or time slot independently in accordance with specific settings applicable to a communications link associated with a burst or time slot; and
digital comparator means, for
comparing whether said analog data signal is above or below an adaptable threshold or slice level, said slice level being adapted to correct for DC offset experienced by said digital data recovery circuit after receiving a sync word, said slice level for each burst or time slot being set independently in accordance with specific settings applicable to a communications link associated with a burst or time slot, said set slice level being stored for each burst or time slot; and
comparing said digital data signal and said slice level, for providing said recovered digital data, wherein said digital filter means are arranged for digitally adjusting said filter time constants and slice level, further comprising storage means for storing and retrieving the slice level during the communications link.

9. The digital data recovery circuit according to claim 8, wherein said digital filter means comprise a Low Pass (LP) Infinite Impulse Response(IIR) filter having at least one digitally adjustable filter time constant.

10. The digital data recovery circuit according to claim 9, arranged such that the filter time constant can be digitally set to provide a slow, fast and ultra fast filter operation mode or a hold mode.

11. The digital data recovery circuit according to claim 10, comprising at least two digitally adjustable filter operation modes, arranged such that for each filter operation mode said filter time constants can be set separately.

12. The digital data recovery circuit according to claim 8, further comprising means for adjusting said slice level taking DC offset levels into account.

13. Radio equipment of a radio communications systems for wireless telecommunication, the radio equipment comprising transmitter, receiver and control means, arranged for providing radio communication in accordance with a Time Division Multiple Access (TDMA) radio communications standard, said radio equipment further comprising
a digital data recovery circuit, said digital data recovery circuit comprising
analog-to-digital (ADC) converter means for converting said analog data signal into a digital data signal,
digital filter means for filtering said digital data signal in accordance with set filter time constants, said filter means providing a threshold or slice level, wherein said slice level is set for each burst or time slot independently in accordance with specific settings applicable to a communications link associated with a burst or time slot;
digital storage means for storing said slice level and slice time constant and
digital comparator means for
comparing whether said analog data signal is above or below an adaptable threshold or slice level, said slice level being adapted to correct for DC offset experienced by said digital data recovery circuit after receiving a sync word, said slice level for each burst or time slot being set independently in accordance with specific settings applicable to a communications link associated with a burst or time slot, said set slice level being stored for each burst or time slot; and
comparing said digital data signal and said slice level for providing said recovered digital data, wherein said digital filter means are arranged for digitally adjusting said filter time constants and slice level, further comprising storage means for storing and retrieving the or each slice level during the communication link.

14. The radio equipment according to claim 13, arranged as a radio access unit or radio base station for use in a cellular radio communications system.

15. The radio equipment according to claim 14, arranged as a radio terminal unit, such as radio telephone, for use in a cellular radio communications system.

* * * * *